United States Patent

Vogelgesang et al.

[15] 3,668,699

[45] June 6, 1972

[54] MAGNETIC VIEWER FOR DISKS HAVING MAGNETIC POLARITY ALIGNMENT

[72] Inventors: Peter J. Vogelgesang, Roseville; John D. Holm, Lake Elmo, both of Minn.

[73] Assignee: Minnesota Mining and Manufacturing Company, St. Paul, Minn.

[22] Filed: Nov. 12, 1970

[21] Appl. No.: 88,589

[52] U.S. Cl. ...............................................340/373, 340/378

[51] Int. Cl. .........................................G08b 5/24, G08b 5/26

[58] Field of Search ..........................................340/373, 378

[56] References Cited

UNITED STATES PATENTS

| | | | |
|---|---|---|---|
| 3,300,776 | 1/1967 | Fitch | 340/373 |
| 3,469,258 | 9/1969 | Winrow | 340/373 |

*Primary Examiner*—Harold I. Pitts

*Attorney*—Kinney, Alexander, Sell, Steldt & Delahunt

[57] ABSTRACT

A device for providing a visual indication of data represented by magnetic polarity alignments at each of a plurality of disparate magnetized regions defining a fixed two-dimensional pattern. The device comprises a board containing a plurality of disks positioned in said fixed pattern, which disks are constrained to rotate with their flat surfaces in the plane of the fixed pattern. Each disk comprises magnetized magnetic material having a magnetic polarity alignment parallel to a given flat surface of the disk and a plurality of visible indicia positioned on the given flat surface of the disk in a predetermined order in relation to the polarity alignment. A mask is positioned on the board to cover the disks and contains apertures aligned over a predetermined portion of each disk position for providing a view of whichever ones of the visible indicia on the disks are rotatably aligned with the apertures.

10 Claims, 10 Drawing Figures

PATENTED JUN 6 1972 3,668,699

SHEET 1 OF 2

INVENTORS
PETER J. VOGELGESANG
JOHN D. HOLM
BY Kinney, Alexander,
Sell, Steldt & DeLaHunt
ATTORNEYS INVENTORS
PETER J. VOGELGESANG
JOHN D. HOLM
BY Kinney, Alexander, Sell, Steldt & DeLaHunt
ATTORNEYS

MAGNETIC VIEWER FOR DISKS HAVING MAGNETIC POLARITY ALIGNMENT

BACKGROUND OF THE INVENTION

1. Field of the Invention

The present invention pertains to magnetically encoded visual communications and is specifically directed to a device for providing a visual indication of data represented by magnetic polarity alignments at disparate magnetized regions defining a two-dimensional pattern.

2. Description of the Prior Art

A device for providing an indication of data represented by magnetic polarity alignments at a plurality of disparate magnetized regions is described in U.S. Pat. No. 3,015,087 to O'Gorman. O'Gorman describes a device for providing an indication of data magnetically encoded in a document and represented by the angle of magnetic polarity alignment in the plane of the document. Other devices for providing indications of data magnetically encoded in documents are described in U.S. Pat. Nos. 3,430,200 to Barney; 3,453,598 to Schweizer; and 3,465,307 to Schmidt. The devices described in the aforementioned patents do not, however, provide a separate visual indication of the datum encoded at each separate magnetized region, but instead include complex and electrical apparatus which, in addition to providing indications of the magnetically encoded data, also compares for validation purposes the provided indications with indications representing stored data. By providing a visual indication of the datum encoded at each of a plurality of magnetized regions, magnetically encoded documents having a plurality of magnetized regions can be validated without using the complex and electrically powered apparatus of the prior art devices.

An apparatus which provides visual indications of certain magnetic polarity alignments at each of a plurality of magnetized regions defining a fixed pattern is described in U.S. Pat. No. 3,036,300 to Knight. The Knight apparatus is not capable of providing visual indications of data represented by the angle of the polarity alignment in the plane of a document, such as the pass card described in the aforementioned O'Gorman patent.

SUMMARY OF THE INVENTION

The present invention is a device for providing a visual indication of data represented by magnetic polarity alignments at each of a plurality of disparate magnetized regions defining a fixed two-dimensional pattern. The novel device is a magnetic viewer which comprises a board containing a plurality of disks positioned in said fixed pattern, which disks are constrained to rotate with their flat surfaces in the plane of the fixed pattern. Each disk comprises magnetized magnetic material having a magnetic polarity alignment parallel to a given flat surface of the disk and a plurality of visible indicia positioned on the given flat surface of the disk in a predetermined order in relation to the polarity alignment. Indicator means are positioned on the board in relation to the disks to provide visual indications of the visible indicia indicating the rotational alignments of the disks. The indicator means are preferably apertures contained in a mask which is positioned on the board to cover the disks. The apertures are aligned over a predetermined portion of each disk position for providing a view of whichever ones of the visible indicia on the disks are rotatably aligned with the apertures.

In a preferred embodiment, the magnetic viewer of the present invention is useful for providing a visual indication of data magnetically encoded in a document. To make it more difficult for the document code to be cracked, the relationship between the polarity alignment and the predetermined order of the visible indicia at the different magnetized regions of the document may be varied. Accordingly, in this preferred embodiment of the magnetic viewer, the relationship between the magnetic polarity alignment and the predetermined order of the visible indicia on the disks is different for different disks.

For example, when using numerical indicia, the numbers on the disks may be scrambled in some disks and in numerical order on other disks. Even more complex codes are possible by using alphanumeric indicia.

Preferably, the board contains a plurality of sockets positioned in the fixed pattern. Each of the sockets contains a disk and further contains a liquid having a density greater than the density of the disk. Preferably, the liquid is transparent. The liquid serves as a bearing for the disk and supports the disk near the mask aperture. This liquid also damps the rotation of the disks. A transparent cover is provided over the mask to contain the liquid in each of the sockets.

Preferably, each socket further contains a second liquid having a density less than the density of the disk. This second liquid is transparent and immiscible with the liquid having a density greater than the density of the disk. The second liquid prevents the disks from contacting the transparent covering of the apertures and also prevents droplets of the first liquid from adhering to the transparent covering of the apertures as may occur when the magnetic viewer is tipped or by condensation. Such adhered droplets may sometimes distort the images of the indicia when viewed through the apertures.

Preferably, each socket further contains a pin positioned through the center of the disk. The disk is free to rotate about the pin. The pin prevents the disk from touching a side surface of the socket and thereby prevents the disk from being inhibited from rotating by reason of surface tension which would be developed by the liquids if the disk were to contact a side surface of the socket.

There is further disclosed herein a device for magnetically encoding a document having a broad stratum containing magnetic material to provide in the stratum one or more disparate magnetized regions of various polarity alignments representative of data. This encoding device is a separate invention of Peter J. Vogelgesang, one of the co-inventors of the magnetic viewer of the present invention.

DESCRIPTION OF THE PREFERRED EMBODIMENT

Figure 1:
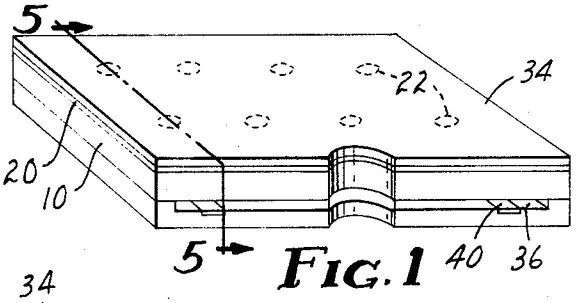
FIG. 1 is a perspective view of a magnetic viewer embodying the present invention.
Figure 2:
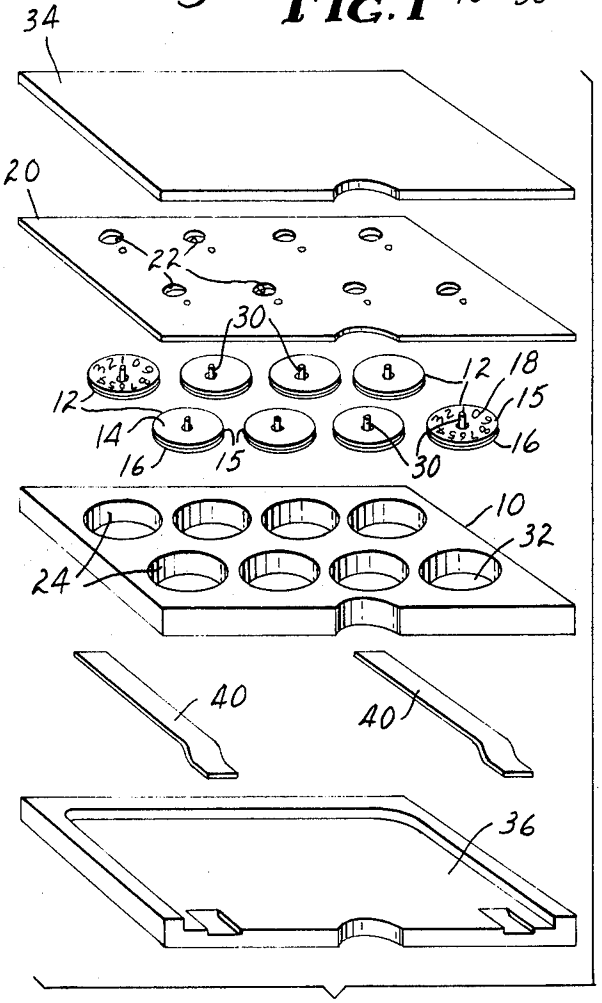
FIG. 2 is an exploded perspective view showing the structural elements of the magnetic viewer shown in FIG. 1.

Referring to FIGS. 1 and 2, a board 10 contains a plurality of disks 12 constrained to rotate with their flat upper surfaces 14 in a fixed two-dimensional pattern. The board is a nonmagnetic material such as plastic.

Each disk 12 comprises a stratum including a polyvinyl chloride material which stratum 15 is uniformly coated with a layer of magnetic material 16, such as $\gamma Fe_2O_3$, on the underside thereof. This magnetic material 16 is magnetized to have a magnetic polarity alignment in a plane parallel to the flat surfaces 14 of the disk 12. The magnetic polarity alignments on the disks 12 are schematically illustrated by dashed lines in FIGS. 3 and 4.

Figure 3:
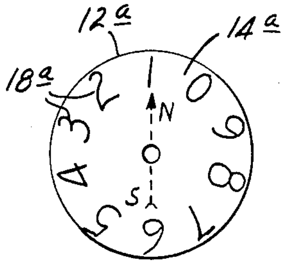
FIGS. 3 and 4 are elevational views of disks employed in the viewer of FIG. 1, enlarged to provide greater detail.
Figure 4:
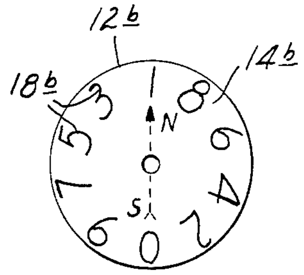

Each disk 12 contains a plurality of visible indicia 18 such as numerals positioned on the flat surface 14 in a predetermined order in relation to the magnetic polarity alignment. Referring to FIGS. 3 and 4, it is seen that the relationship between the magnetic polarity alignment and the predetermined order of visible indicia 18 may be different for different disks 12. For example, on the disk 12a of FIG. 3, the visible indicia 18a are numbers arranged in a numerical sequence; whereas on the disk 12b of FIG. 4, the visible indicia 18b are numbers arranged in a scrambled sequence.

A mask 20 is positioned on the board 10 to cover the disks 12 and contains apertures 22 aligned over a predetermined portion of each disk position for providing a view of whichever ones of the visible indicia 18 on the disks 12 are rotatably aligned with the apertures 22. The mask 20 is rubber.

Figure 6:
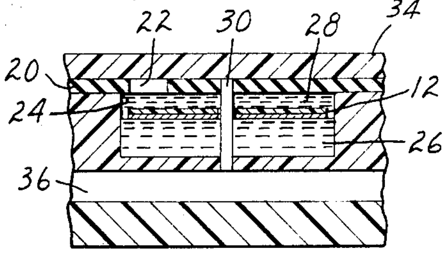
FIG. 6 is a sectional view of a single socket shown in FIG. 5, which view is enlarged to provide greater detail.

The board 10 contains a plurality of sockets 24 positioned in the fixed pattern. Each of the sockets 24 contains one of the aforementioned disks 12 and further contains a liquid 26 having a density greater than the density of the disks 12. This liquid 26 is preferably a transparent fluorocarbon. See FIG. 6.

Each socket also contains a second liquid 28 having a density less than the density of the disk 12. The second liquid 28 is a transparent oil and is immiscible with the liquid 26.

Each disk 12 is positioned in its socket 24 by means of a pin 30 which passes through the center of the disk 12. The disk 12 is free to rotate on the pin 30 and is also free to slide on the pin 30. The pins 30 are secured to the centers of the bottoms 32 of the sockets 24. The pins 30 are also a nonmagnetic material such as plastic.

A transparent cover 34 is provided over the mask 20 to contain the liquids 26, 28 in each of the sockets 24. The mask 20 as positioned between the transparent cover 30 and the board 10 performs the function of a gasket.

Figure 7:
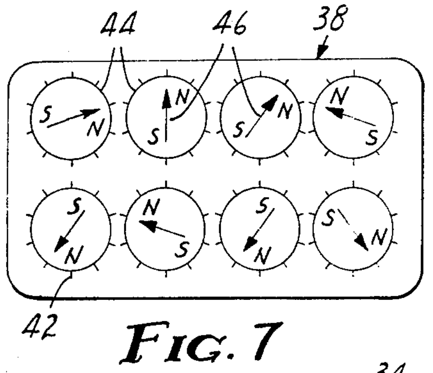
FIG. 7 is an elevational schematic illustration of a magnetically encoded document.
Figure 5:
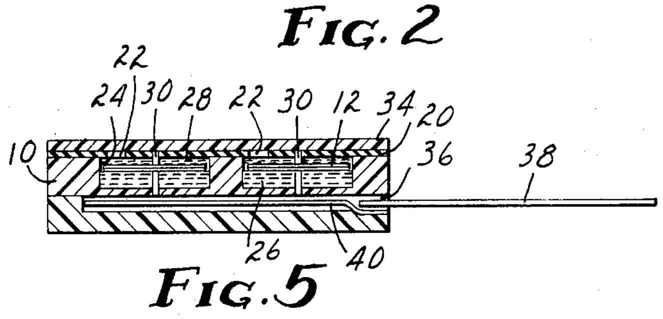
FIG. 5 is a cross-section of the viewer of FIG. 1 taken along lines 5—5 shown with a document (such as is shown in FIG. 7) being inserted into the viewer.

Referring to FIGS. 2 and 5, the device further contains a slot 36 for receiving a magnetically encoded document 38 such as the flat document shown in FIG. 7. The slot 36 includes flexible spring members 40 for closely registering the document 38 with the sockets 24 and with the flat surface 42 of the document 38 parallel to the plane of rotation of the disks 12.

The document 38 has a broad stratum containing magnetic material. This broad stratum is parallel to the flat surface 42 of the document 38. The document 38 is magnetized in disparate regions 44 to have magnetic polarity alignments illustrated schematically by arrows 46, which polarity alignments extend breadthwise in the broad stratum. The disparate magnetized regions 44 are arranged in the fixed pattern corresponding to the fixed pattern of the sockets 24 in the magnetic viewer shown in FIGS. 1 and 2. The magnetic stratum may be concealed within the document so that it is not apparent that the document 38 contains magnetic material.

Figures 8, 9, 10:
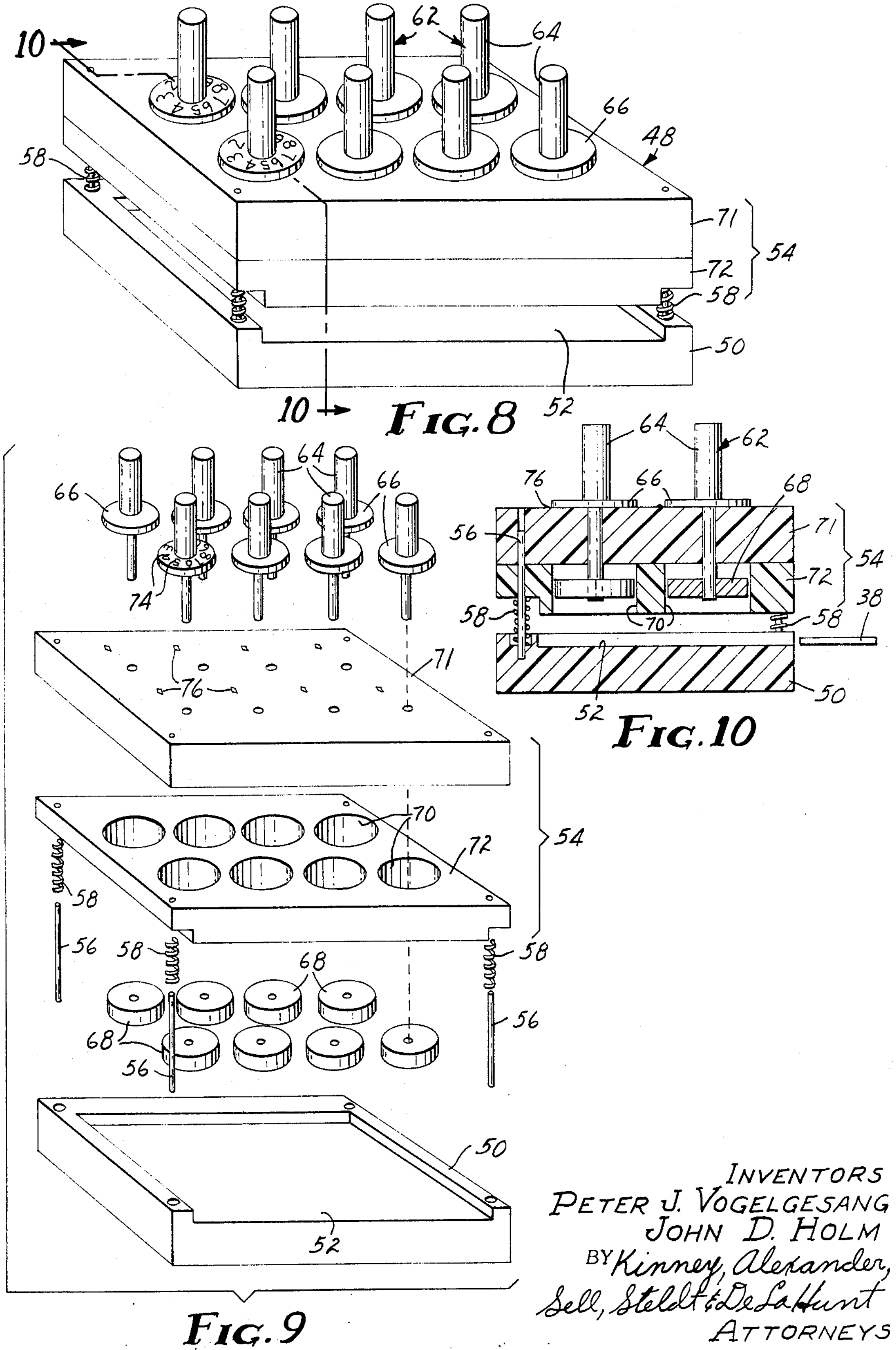
FIG. 8 is a perspective view of a device for magnetically encoding a document of the type shown in FIG. 7.
FIG. 9 is an exploded perspective view of the encoding device of FIG. 8 showing the structural elements of the encoding device in detail.
FIG. 10 is a sectional view taken along lines 10—10 of FIG. 8.

The encoding device 48 which is illustrated in FIGS. 8, 9 and 10 includes a base 50 for receiving a document 38 (FIG. 7) having a broad stratum including magnetic material. The base 50 includes a given flat surface 52 for receiving a document 38 in a predetermined position with its broad stratum parallel to the given flat surface 52. The encoding device 48 further includes a carriage 54 which is operatively coupled to the base 50 by shafts 56 which slidably penetrate the carriage 54 to be engaged with the base 50, but is physically restrained from the base 50 by retarding means 58, such as springs, except when a force is applied against the carriage 54 in a direction shown by the arrow 60 to overcome the restraint of the retarding means 58 so as to engage the carriage 54 with the base 50.

The carriage 54 comprises a plurality of rotatable and magnetized elements 62 positioned in the carriage 54 in the aforementioned fixed pattern in relation to a plane which is parallel to the flat surface 52 of the base 50 when the carriage 54 is engaged with the base 50. The rotatable and magnetized elements 62 each include a shaft 64 which extends through an indicator plate 66 into a disk 68 of magnetized magnetic material. When the encoder device 48 is assembled, the magnetized disks 68 are positioned within the holes 70 which extend through carriage plates 71, 72.

Each of the magnetized disks 68 is rotatable in the carriage 54 in a plane which is parallel to the given flat surface 52 of the base 50 when the carriage 54 is engaged with the base 50. The magnetized disks 68 include a stratum of magnetic material such as the barium ferrite material which is described in a brochure entitled "Plastiform Permanent Magnet Material," which brochure is available from the Dielectric Materials & Systems Division of Minnesota Mining and Manufacturing Company, St. Paul, Minnesota. The disks 68 are about one-fourth inch (6 mm) thick. This magnetic material is oriented to have an easy axis of magnetization in the plane of the stratum. Each disk 68 is magnetized to contain a polarity alignment extending parallel to the flat surfaces of the disk. Each of the magnetized disks has a magnetic polarity alignment in the plane of rotation. A plurality of visible indicia 74 such as numerals are spaced in a predetermined order about the outer edge of each indicator plate 66.

The carriage 54 further includes an indicator 76 corresponding to each of the rotatable and magnetized elements 62. The indicators 76 cooperate with the visible indicia 74 to provide an indication of the polarity alignment in the magnetized disk 68 as related by the predetermined order of the visible indicia 74 spaced about the outer edge of the indicator plate 66 to the indicator 76. The carriage 54, being mounted to move on shafts 56 in a direction perpendicular to the base 50, is thus operatively coupled to the base 50 for engaging the rotatable and magnetized elements 62 with the said document 38 in a direction perpendicular to the given flat surface 52.

Except for the magnetized disks 68 and the springs 58, the encoding device is a nonmagnetic material such as plastic. The indicator plates 66 comprise a stratum including a polyvinyl chloride material.

What we claim is:

1. A device for providing a visual indication of data represented by magnetic polarity alignments at each of a plurality of disparate magnetized regions defining a fixed two-dimensional pattern, which device comprises
   - a board containing a plurality of disks positioned in said fixed pattern, which disks are constrained to rotate with their flat surfaces in the plane of said fixed pattern, each disk comprising
     - magnetized magnetic material having a magnetic polarity alignment parallel to a given flat surface of the disk, and
     - a plurality of visible indicia positioned on the given flat surface of the disk in a predetermined order in relation to said polarity alignment; and
   - indicator means positioned on the board in relation to the disks to provide visual indications of the visible indicia indicating the rotational alignment of the disks.

2. A device according to claim 1, wherein the relationship between the magnetic polarity alignment and the predetermined order of the visible indicia is different for different disks.

3. A device according to claim 1, wherein the visible indicia are numbers and wherein the predetermined order of the numbers on one or more of the disks is scrambled.

4. A device according to claim 1, wherein the board contains a plurality of sockets positioned in the fixed pattern, each of which sockets contains a said disk and further contains a liquid having a density greater than the density of said disk.

5. A device according to claim 4, wherein each socket further contains a second liquid having a density less than the density of said disk, which second liquid is immiscible with the liquid having a density greater than the density of the disk.

6. A device according to claim 4, wherein each socket further contains a pin positioned through the center of said disk and about which pin said disk is free to rotate.

7. A device according to claim 6, wherein each socket further contains a second liquid having a density less than the density of said disk, which second liquid is immiscible with the liquid having a density greater than the density of the disk.

8. A device according to claim 1, wherein each disk comprises a stratum including a polyvinyl chloride material, which stratum is coated with magnetic particles.

9. A device for providing a visual indication of data represented by magnetic polarity alignments at each of a plurality of disparate magnetized regions defining a fixed two-dimensional pattern, which device comprises a board containing a plurality of disks positioned in said fixed pattern, which disks are constrained to rotate with their flat surfaces in the plane of said fixed pattern, each disk comprising magnetized magnetic material having a magnetic polarity alignment parallel to a given flat surface of the disk, and a plurality of visible indicia positioned on the given flat surface of the disk in a predetermined order in relation to said polarity alignment; and a mask positioned on the board to cover the disks and containing an aperture aligned over a predetermined portion of each disk position for providing a view of whichever ones of the visible indicia on the disks are rotatably aligned with the aperture.

10. A device according to claim 1 wherein there are at least three visible indicia positioned on the given flat surface of each disk.

* * * * *